(12) United States Patent
Dewan

(10) Patent No.: US 6,654,447 B1
(45) Date of Patent: Nov. 25, 2003

(54) METHOD AND SYSTEM FOR PAUSING A SESSION WITH AN INTERACTIVE VOICE RESPONSE UNIT

(75) Inventor: Rohit Dewan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 211 days.

(21) Appl. No.: 09/688,306

(22) Filed: Oct. 13, 2000

(51) Int. Cl.7 ................................................ H04M 1/64
(52) U.S. Cl. .......................................... 379/76; 379/77
(58) Field of Search ................................ 600/300, 301, 600/481, 500; 128/900; 705/1; 379/76, 77, 70, 74, 88.01, 88.02, 88.03, 88.04, 88.12, 88.13, 88.17, 88.23

(56) References Cited

U.S. PATENT DOCUMENTS

| | | |
|---|---|---|
| 5,594,638 A | 1/1997 | Iliff |
| 5,819,029 A | 10/1998 | Edwards et al. |
| 5,825,856 A | 10/1998 | Porter et al. |
| 5,910,107 A | 6/1999 | Iliff |
| 6,070,241 A | 5/2000 | Edwards et al. |
| 6,154,527 A | 11/2000 | Porter et al. |
| 6,192,112 B1 | 2/2001 | Rapaport et al. |
| 6,206,829 B1 * | 3/2001 | Iliff ............................ 600/300 |
| 6,236,724 B1 | 5/2001 | Labaton et al. |
| 6,246,986 B1 | 6/2001 | Ammicht et al. |
| 6,411,686 B1 | 6/2002 | Porter et al. |

* cited by examiner

Primary Examiner—Fan Tsang
Assistant Examiner—Ming Chow
(74) Attorney, Agent, or Firm—Baker Botts L.L.P.

(57) ABSTRACT

A system establishes a session with a voice response unit. The system receives a pause signal and pauses the session, and receives a resume signal and resumes the session. A message interrupted by the pause may be continued or replayed.

32 Claims, 4 Drawing Sheets

METHOD AND SYSTEM FOR PAUSING A SESSION WITH AN INTERACTIVE VOICE RESPONSE UNIT

TECHNICAL FIELD OF THE INVENTION

This invention relates generally to the field of telecommunications and more specifically to a method and system for pausing a session with an interactive voice response unit.

BACKGROUND OF THE INVENTION

An increasing number of telephone callers communicate with interactive voice response units during telephone calls. A voice response unit provides automated responses to a caller's requests. The caller inputs information using spoken words or tones generated by a telephone. In response, the voice response unit outputs information as pre-recorded or synthesized messages. Traditional voice response units disconnect a session with a caller when a user fails to respond during an allotted time period.

SUMMARY OF THE INVENTION

While known approaches have provided improvements over prior approaches, the challenges in the field of telecommunications have continued to increase with demands for more and better techniques having greater convenience. Therefore, a need has arisen for a method and system for pausing a session with an interactive voice response unit.

In accordance with the present invention, a method and system for pausing a telephone call are provided that substantially eliminate or reduce the disadvantages and problems associated with previously developed systems and methods.

According to one embodiment of the present invention, a system for pausing a session with a voice response unit is disclosed. The system includes an interface that establishes a session. A processor pauses the session in response to receiving a pause signal. A state engine determines an interrupted state of the session at which the processor pauses the session. The processor resumes the session at the interrupted state of the session in response to receiving a resume signal.

According to another embodiment of the present invention, a method for pausing a session with a voice response unit is disclosed. A session with a voice response unit is established. A pause signal is received. The session is paused in response to the pause signal. An interrupted state of the session substantially at which the session is paused is determined. A resume signal is received. The session is resumed at the interrupted state in response to the resume signal.

According to another embodiment of the present invention, a method for pausing a session with a voice response unit is disclosed. A session with a voice response unit is established. A pause signal is sent to pause the session and interrupt a state of the session. A resume signal is sent to resume the session at the interrupted state of the session.

According to another embodiment of the present invention, voice response software embodied in a computer-readable medium is disclosed. The software establishes a session with a voice response unit. A pause signal is received. The session is paused in response to the pause signal. An interrupted state of the session substantially at which the session is paused is determined. A resume signal is received. The session is resumed at the interrupted state in response to the resume signal.

According to another embodiment of the present invention, a system for pausing a session with a voice response unit is disclosed. The system includes means for establishing a session with a voice response unit and means for receiving a pause signal. Means for pausing pauses the session in response to the pause signal. Means for determining determines an interrupted state of the session substantially at which the session is paused. Means for receiving receives a resume signal. Means for resuming resumes the session at the interrupted state in response to the resume signal.

Embodiments of the invention may provide numerous technical advantages. A technical advantage of one embodiment is that a caller may pause a telephone call to interrupt a message played by a voice response unit. The caller may also resume the session when he is ready. The caller may select to either replay or continue the interrupted message. Another technical advantage of one embodiment is that a voice response unit determines the state at which a session is paused and a message is interrupted. The voice response unit may resume the session at the determined state, and may replay or continue the interrupted message. Another technical advantage of one embodiment is that a workflow is used to direct the actions of a voice response unit. The workflow includes stages during which a session may be paused and a message may be replayed. Other technical advantages are readily apparent to one skilled in the art from the following figures, descriptions, and claims.

DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
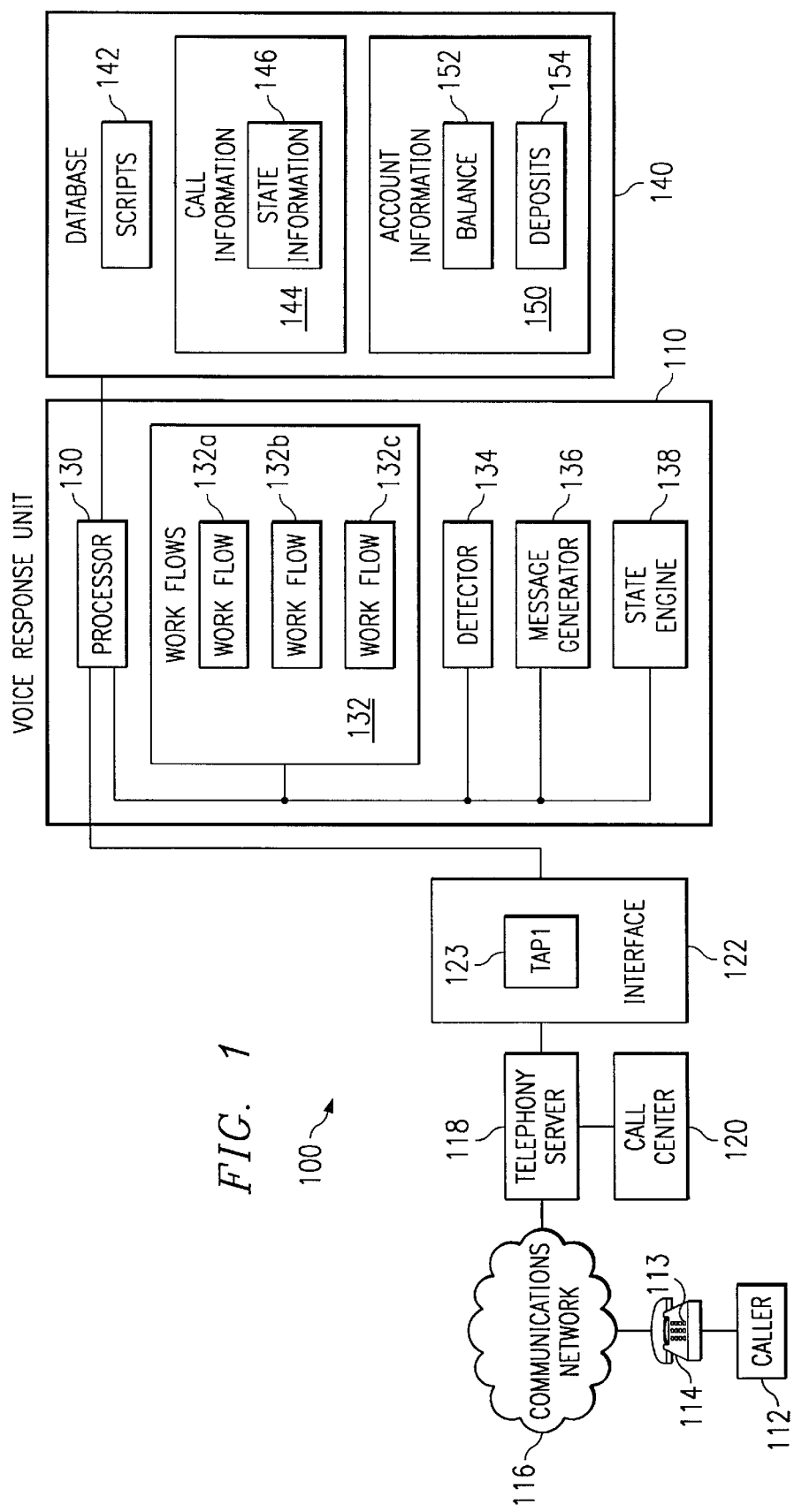
FIG. 1 is a block diagram of one embodiment of a system for pausing a session with a voice response unit.

FIG. 1 is a block diagram of one embodiment of a system 100 for pausing a session with a voice response unit 110. System 100 includes a voice response unit 110 that allows caller 112 to pause a session with voice response unit 110. To pause a session, caller 112 transmits a pause signal to voice response unit 110. Voice response unit 110 pauses the session and determines the state of the session at which the session is paused. To resume the session, caller 112 transmits a resume signal to voice response unit 110. In response, voice response unit 110 resumes the session at the state at which the session was paused.

In one embodiment, caller 112 communicates with voice response unit 110 using a communications device 114. A session, for example, a voice session, is the active communication connection between voice response unit 110 and communications device 114. Communications device 114 may include a telephone, cell phone, or other suitable device that allows caller 112 to communicate with voice response unit 110. Caller 112 may input information to voice response unit 110 using voice, touchtones, or other signals generated by communications device 114. Caller 112 transmits a pause signal to pause a session and a resume signal in order to resume a paused session. The pause and resume signals may be transmitted by, for example, pressing a predetermined key 113 of communications device 114 or saying a predetermined word. The predetermined key 113 or word may be unique to voice response unit 110 or may be commonly known hot commands that are used with other voice response units as well. For example, hot commands may involve the use of a hot key or hot word.

Communications device 114 transmits signals, for example, pause and resume signals, to communications network 116. Communications network 116 may include wired and/or wireless communication paths, for example, a public switched telephone network, a local area network, a wide area network, the Internet, or other suitable network that provides communication paths. A telephony server 118 coupled to communication network 116 allows caller 112 to access voice response unit 110. Telephony server 118 may include a communications server, a private branch exchange, an automatic call distributor, a switch or other system that establishes voice paths. In one embodiment, telephony server 118 may also handle data paths. Telephony server 118 may also allow caller 112 to communicate with a call center 120. Call center 120 may include operators, customer representatives, or other people who are intended to aid caller 112.

An interface 122, which may include a telephone application programming interface (TAPI) 123, establishes and maintains communication between caller 112 and voice response unit 110. Examples of TAPIs include Java Telephony API and Microsoft/Intel Telephony API. Use of telephony server 118 and TAPI 123 is only exemplary. System 100 contemplates any suitable arrangement to establish communication between communications device 114 and voice response unit 110.

Voice response unit 110 receives input from caller 112 and outputs voice responses, for example, recorded or generated voice responses, to caller 112. Voice response unit 110 includes a processor 130, which controls workflows 132, a detector 134, a message generator 136, and a state engine 138 in order to produce responses to input from caller 112. Workflows 132 include a series of stages, where the subsequent stage of a present stage is determined either by the present stage or by the present stage and a predetermined condition. The stages of workflows 132 describe the output of voice response unit 110 in response to specific input from caller 112. An example of a workflow 132a is described in connection with FIG. 2. Processor 130 uses workflows 132 to determine how voice response unit 110 is to respond to caller 112.

Detector 134 detects input into voice response unit 110 from caller 112 and transmits the input to processor 130. Processor uses message generator 136 to generate messages that voice response unit 110 presents to caller 112. Message generator 136 may include a voice synthesizer or a player that plays pre-recorded messages. State engine 138 determines the state of a session. The state may represent a particular point of a workflow stage, for example, a particular point of a message played during the workflow stage. For example, an interrupted state may represent the particular point of a workflow stage at which processor 130 pauses a session. This point may occur during the playing of a message.

Voice response unit 110 stores data in and retrieves data from database 140, which may be distributed over any number of computer systems. In a particular example of a voice response unit 110 used by a financial institution, database 140 may include scripts 142, session information 144, which includes state information 146, and account information 150, which includes balance 152 and deposit 154 information. Scripts 142 include text for messages to be presented to caller 112. Session information 144 includes information that tracks the processing of individual calls. State information 146 includes information about the state of a session. Account information 150 includes data that may be requested by caller 112. For example, caller 112 may request information about the balance of or deposits to a bank account, which is included in balance 152 and deposits 154.

In operation, caller 112 transmits signals to voice response unit 110 using communications device 114. In response, processor 130 plays a message to caller 112 by retrieving a script from scripts 142 and using message generator 136 to generate the message. State engine 138 monitors the call and places information about the session in session information 144. To pause the session, caller 112 transmits a pause signal to voice response unit 110. Caller 112 may simply say a word or press a key 113 to pause the session. In response, processor 130 pauses the session and interrupts the message, and state engine 138 records the interrupted state of the session in state information 146. To resume the session, caller 112 transmits a resume signal to resume the session. Again, caller 112 may simply say a word or press a key 113 to pause the session. Processor 130 resumes the session and plays the interrupted message. Caller 112 may have the option of continuing or replaying the interrupted message.

An advantage of system 100 is that it provide a convenient way for caller 112 to pause a telephone call to interrupt a message played by voice response unit 110. Caller 112 may also resume the session when he is ready. Caller 112 may select to either replay or continue the interrupted message. Another advantage of system 100 is that voice response unit 110 determines the state at which a session is paused and a message is interrupted. Voice response unit 110 may resume the session at the determined state, and may replay or continue the interrupted message.

Figure 2:
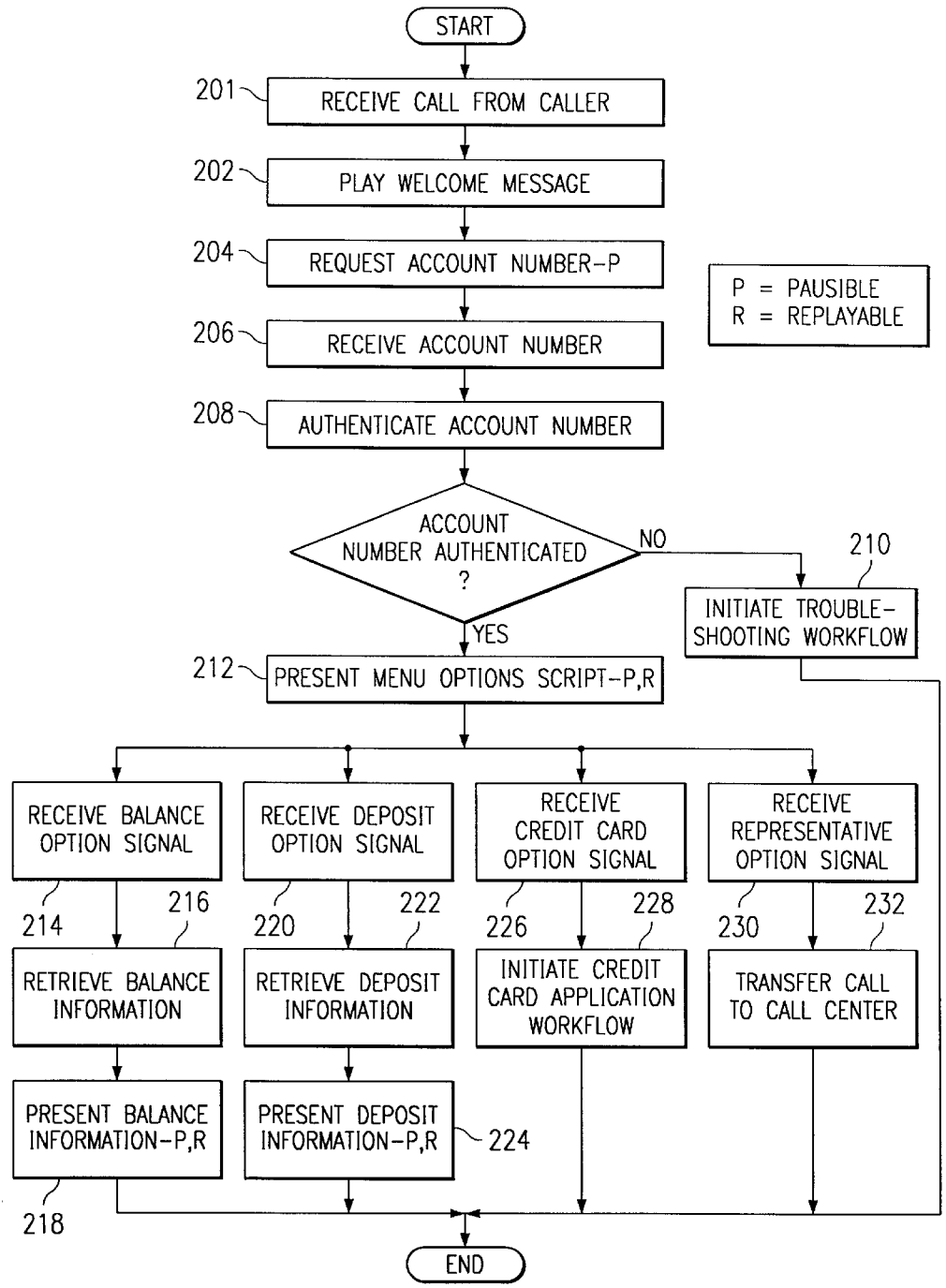
FIG. 2 is a flowchart illustrating one embodiment of a workflow that may be used with a system for pausing a session with a voice response unit.

FIG. 2 is a flowchart illustrating one embodiment of a workflow 132a of system 100. A workflow typically includes stages, where each stage defines an output from processor 130 or voice response unit 110 in response to an input to processor 130 or voice response unit 110. For example, caller 112 may input a data request signal into voice response unit 110, and in response voice response unit 110 retrieves data and outputs the data to caller 112. In one embodiment, workflow 132a describes a process by which caller 112 may obtain information about a bank account or may communicate with a customer representative of call center 120.

Workflow 132a includes stages during which caller 112 may select to pause the session and interrupt the message being played. In FIG. 2, a stage that is pausible is marked with a "P". Certain types of stages may be pausible. For example, stages that present information to or request information from caller 112 may be pausible. Other types of stages may be non-pausible. For example, stages that retrieve information from a database may be non-pausible. The interrupted message may be continued or replayed when the session is resumed. Caller 112 may be given the option of replaying or continuing the interrupted message. In FIG. 2, a stage that has a replayable message is marked with an "R". Certain types of messages may be replayable, for example, messages that present a long list of information. Other types of messages may be non-replayable, for example, brief greeting messages. Methods for pausing a session are described in connection with FIGS. 3 and 4.

Workflow 132a begins at stage 201, where voice response unit receives a call from caller 112, which initiates a session. In response, voice response unit 110 plays a welcome message for caller 112 at stage 202. Processor 130 plays the welcome message by retrieving a welcome script from scripts 142 and using message generator 136 to generate the welcome message. The welcome message may instruct caller 112 to press a predetermined key or say a predetermined word in order to pause the session. Alternatively, caller 112 may use a commonly known hot command, for example, a hot key or hot word, to pause the session. The welcome message requests an account number from caller 112 at stage 204. Caller 112 may pause the session at stage 204, for example, to retrieve a checkbook. Caller 112 is not given the option to replay the message when the session is resumed. Caller 112 inputs an account number, which voice response unit 110 receives at stage 206.

At stage 208, voice response unit 110 authenticates the account number. If the account number is not authenticated, processor 130 initiates a troubleshooting workflow 132b at stage 210, and workflow 132a terminates. If the account number is authenticated, voice response unit 110 presents a menu options message at stage 212. Caller 112 may pause the session to interrupt the message at this step in order to, for example, consider the options. Additionally, caller 112 may select to continue or replay the interrupted messages when the session is resumed. The menu options message instructs caller 112 to select a particular key 113 of communications device 114 or say a particular word in order to transmit a signal that indicates the selected option. The options may include, for example, obtaining the balance of a bank account, obtaining recent deposits to the account, applying for a credit card, and transferring to a customer representative.

If processor 130 receives a signal indicating that the balance option has been selected at stage 214, processor 130 retrieves information about the balance at stage 216, which is stored in balances 152 of database 140. Processor 130 generates a message to present the balance information at stage 218. Caller 112 may pause the session to interrupt the message, and may replay or continue the interrupted message upon resuming the session. After completing the message, workflow 132a terminates.

If at stage 220 processor 130 receives a signal indicating that the deposit option has been selected, processor 130 retrieves deposit information from deposits 154 of database 140 at stage 222. Processor 130 presents the deposit information to caller 112 at stage 224. Caller 112 may pause the session to interrupt the message, and then continue or replay the interrupted message upon resuming the session. After completing the message, workflow 132a terminates. If processor 130 receives a signal indicating that the credit card option has been selected at stage 226, processor 130 initiates a credit card application workflow 132c at stage 228, and workflow 132a terminates. If processor 130 receives a signal indicating that the customer representative option has been selected at stage 230, processor 130 transfers the call to call center 120 at stage 232. After the call has been transferred, workflow 132a terminates.

Workflows 132 are used to direct the actions of voice response unit 110. Workflow 132 include stages during which a session may be paused and a message may be replayed, providing an effective way to manage voice response unit 110.

Figure 3:
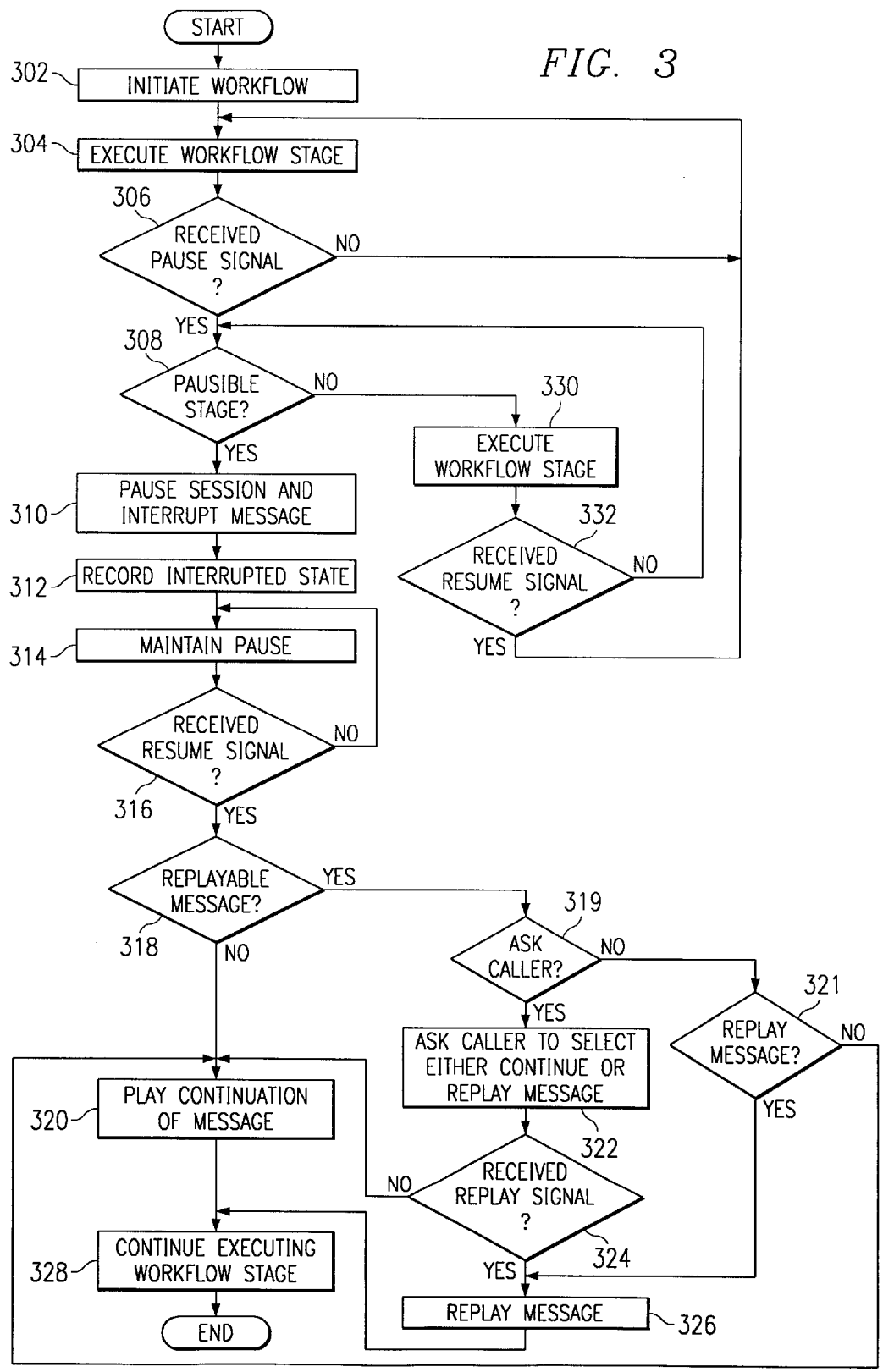
FIG. 3 is a flowchart illustrating one embodiment of a method that voice response unit may use to pause a session with a caller.

FIG. 3 is a flowchart illustrating one embodiment of a method that voice response unit 110 may use to process pause and resume signals received in a session with caller 112. The session is executing in association with a script or workflow. Processor 130 initiates workflow 132 at step 302 and executes workflow 132 at step 304. Under the direction of workflow 132, voice response unit 110 plays a message for caller 112. Processor 130 checks whether detector 134 has received a pause signal at step 306. If no pause signal has been received, the method returns to step 304, where processor 130 executes workflow 132. If a pause signal has been received, the method proceeds to step 308, where processor 130 checks whether the current stage of workflow 132 is pausible.

If the stage is not pausible at step 308, processor 130 continues to execute the workflow at step 330. If a resume signal is received at step 332, the method returns to step 304, where processor 130 executes workflow 132. If a resume signal is not received at step 332, the method proceeds to step 308, where processor 130 checks whether the current stage of workflow 132 is pausible. If the stage is pausible at step 308, processor 130 pauses the session and interrupts the message at step 310. Processor 130 directs state engine 138 to record the interrupted state of the session. State engine 138 determines the interrupted state of the session and then stores the interrupted state in state information 146 at step 312. Voice response unit 110 maintains the pause at step 314.

Processor 130 checks whether detector 134 has received a resume signal at step 316. If no resume signal has been received, the method returns to step 314, where voice response unit 110 maintains the pause. If a resume signal has been received, the method proceeds to step 318. Processor 130 determines whether the message is replayable at step 318. If the message is not replayable at step 318, the method proceeds to step 320, where processor 130 resumes the session and continues the interrupted message, and the method terminates. If the message is replayable at step 318, processor 130 resumes the session and either asks caller 112 or makes a decision on whether to continue or replay the interrupted message at step 319.

If processor 130 asks caller 112 at step 319 whether to continue or replay the interrupted message, processor 130 may play a message requesting the selection at step 322. If voice response unit 110 receives a continue signal at step 324, the method proceeds to step 320, where processor 130 continues the interrupted message, and the method terminates. If voice response unit 110 receives a replay signal at step 324, processor 130 replays the interrupted message at step 326, and the method terminates.

If, instead of asking caller 112, processor 130 makes a decision on whether to continue or replay the interrupted message at step 319, processor 130 decides at step 321. If processor 130 decides to continue the message, processor 130 continues the interrupted message at step 20, and the method terminates. If processor 130 decides to replay the message, processor 130 replays the interrupted message at step 326, and the method terminates.

Figure 4:
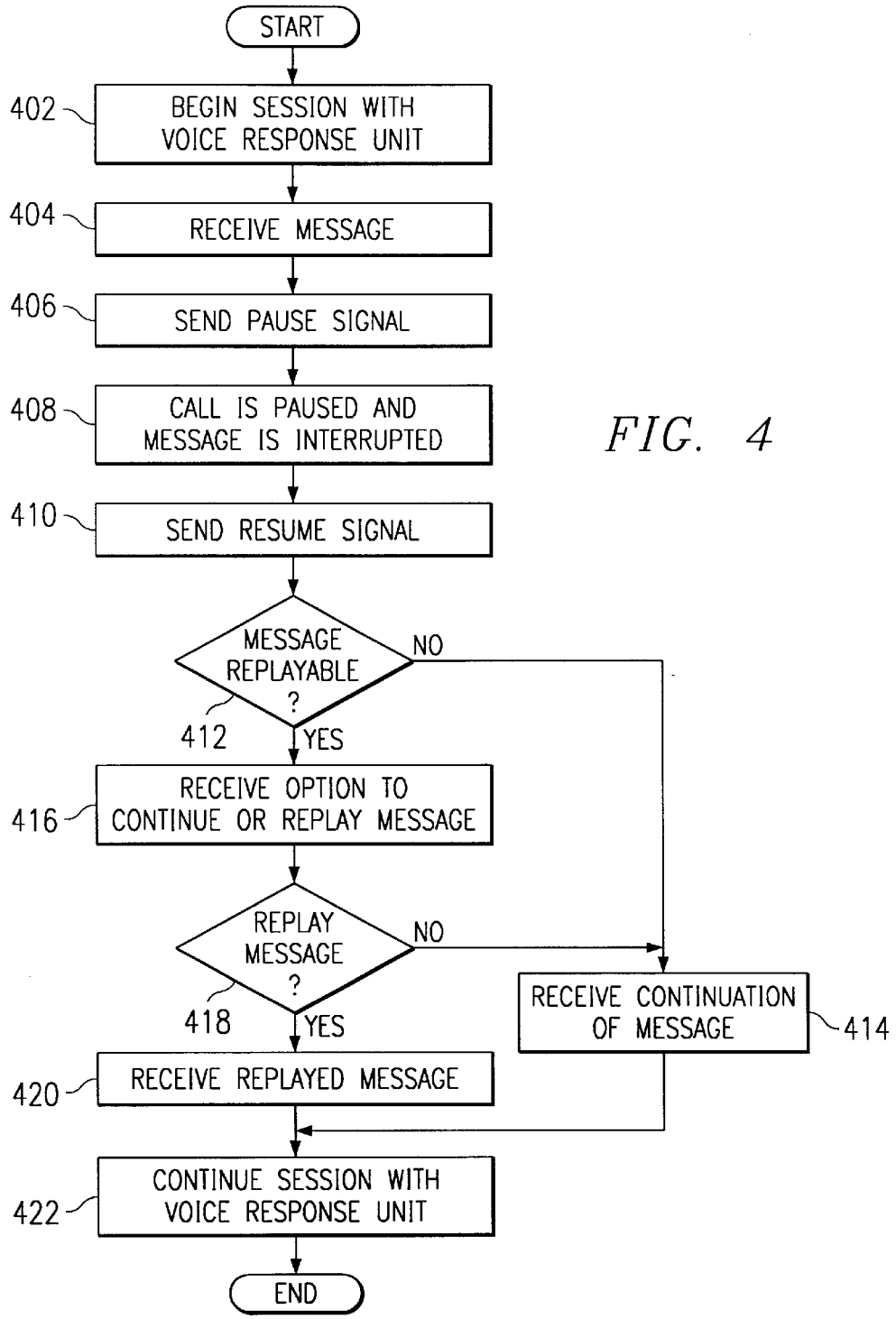
FIG. 4 is a flowchart illustrating one embodiment of a method that a caller may use to pause a session with a voice response unit.

FIG. 4 is a flowchart illustrating one embodiment of a method that a caller 112 may use to pause a session with voice response unit 110. The method begins at step 402, where caller 112 begins a session with voice response unit 110. Caller 112 uses communication device 114 to establish communication with voice response unit 110. In response, voice response unit 110 sends a message to caller 112. Caller 112 receives the message at step 404. The message may provide instructions on how to pause and resume a session, and how to replay or continue a message. Caller 112 decides to pause the session and sends a pause signal at step 406. Caller 112 may use a predetermined hot command, for example, say a predetermined word or press predetermined key 113 of communication device 114, to send the pause signal. The session is paused and the message is interrupted at step 408.

Caller 112 decides to resume the session and sends a resume signal at step 410. Caller 112 may use a predetermined command to send the resume signal. If the interrupted message is not replayable at step 412, caller 112 receives a continuation of the message at step 414, and the method terminates. If the interrupted message is replayable at step 412, caller 112 receives a message asking caller 112 whether to replay or continue the interrupted message at step 416. If caller 112 selects to continue the message at step 418, the method proceeds to step 414, where caller 112 receives a continuation of the message, and the method terminates. If caller 112 selects to replay the message at step 418, caller 112 receives the replayed message at step 420, and the method terminates.

A technical advantage of system 100 is that caller 112 may pause a telephone call to interrupt a message played by voice response unit 110. Caller 112 may also resume the session when he is ready. Caller 112 may select to either replay or continue the interrupted message. Another technical advantage of system 100 is that voice response unit 110 determines the state at which a session is paused and a message is interrupted. Voice response unit 110 may resume the session at the determined state, and may replay or continue the interrupted message. Another technical advantage of one embodiment is that workflows 132 are used to direct the actions of voice response unit 110. Workflow 132 include stages during which a session may be paused and a message may be replayed, providing an effective way to manage voice response unit 110.

Although an embodiment of the invention and its advantages are described in detail, a person skilled in the art could make various alterations, additions, and omissions without departing from the spirit and scope of the present invention as defined by the appended claims.

What is claimed is:

1. A system for pausing a session with a voice response unit, the system comprising:
    an interface operable to establish a session;
    a processor operable to pause the session in response to receiving a pause signal and initiate a workflow comprising a plurality of stages, each stage defining an output from the processor in response to an input to the processor, wherein the workflow further comprises:
        a pausible menu message stage during which the processor is operable to pause the session; and
        a nonpausible information retrieving stage during which the processor is not operable to pause the session; and
    a state engine operable to determine an interrupted state of the session when the processor pauses the session, wherein the processor is operable to resume the session at the interrupted state of the session in response to receiving a resume signal.

2. The system of claim 1, wherein the pause signal comprises a signal from a predetermined hot command.

3. The system of claim 1, further comprising a message generator operable to:
    receive a request for a message from the processor;
    retrieve a script corresponding to the message; and
    play the message.

4. The system of claim 1, wherein the interface comprises a telephone application programming interface.

5. A method for pausing a session with a voice response unit, the method comprising:
    establishing a session with a voice response unit;
    initiating a workflow comprising a plurality of stages, each stage defining an output from the voice response unit in response to an input to the voice response unit, wherein the workflow comprises:
        a pausible menu message stage during which the voice response unit is operable to pause the session; and
        a nonpausible information retrieving stage during which the voice response unit is not operable to pause the session;
    receiving a pause signal;
    pausing the session in response to the pause signal;
    determining an interrupted state of the session when the session is paused;
    receiving a resume signal; and
    resuming the session in response to the resume signal, wherein the session is resumed at the interrupted state of the session.

6. The method of claim 5, wherein receiving the pause signal comprises receiving a signal from a predetermined hot command.

7. The method of claim 5, further comprising:
    interrupting a message when the session is paused;
    determining whether to replay the message; and
    replaying the message.

8. The method of claim 5, further comprising:
    retrieving a script corresponding to a message; and
    playing the message.

9. The method of claim 5, wherein establishing the session comprises using a telephone application programming interface.

10. Voice response software embodied in a computer-readable medium and operable to:
    establish a session with a voice response unit;
    initiate a workflow comprising a plurality of stages, each stage defining an output from the voice response unit in response to an input to the voice response unit, wherein the workflow comprises:
        a pausible menu message stage during which the voice response unit is operable to pause the session; and
        a nonpausible information retrieving stage during which the voice response
    unit is not operable to pause the session;
    receive a pause signal;
    pause the session in response to the pause signal;
    determine an interrupted state of the session when the session is paused;
    receive a resume signal; and
    resume the session in response to the resume signal, wherein the session is resumed at the interrupted state of the session.

11. The voice response software of claim 10, further operable to receive a pause signal from a predetermined hot command.

12. The voice response software of claim 10, further operable to:
    interrupt a message when the session is paused;

determine whether to replay the message; and replay the message.

13. The voice response software of claim 10, further operable to:

retrieve a script corresponding to a message; and play the message.

14. The voice response software of claim 10, further operable to utilize a telephone application programming interface to establish the session.

15. A system for pausing a session with a voice response unit, the system comprising:

means for establishing a session with a voice response unit;

means for initiating a workflow comprising a plurality of stages, each stage defining an output from the voice response unit in response to an input to the voice response unit, wherein the workflow comprises:

a pausible menu message stage during which the voice response unit is operable to pause the session; and a nonpausible information retrieving stage during which the voice response unit is not operable to pause the session;

means for receiving a pause signal;

means for pausing the session in response to the pause signal;

means for determining an interrupted state of the session when the session is paused;

means for receiving a resume signal; and means for resuming the session in response to the resume signal, wherein the session is resumed at the interrupted state of the session.

16. The system of claim 15, wherein means for receiving the pause signal comprises means for receiving a signal from a predetermined hot command.

17. The system of claim 15, further comprising:

means for interrupting a message when the session is paused;

means for determining whether to replay the message; and means for replaying the message.

18. The system of claim 15, further comprising:

means for retrieving a script corresponding to a message; and means for playing the message.

19. The system of claim 15, wherein means for establishing the session comprises means for using a telephone application programming interface.

20. A system for pausing a session with a voice response unit, the system comprising:

an interface operable to establish a session;

a processor operable to pause the session in response to receiving a pause signal, whereby a message is interrupted when the session is paused;

a state engine operable to determine an interrupted state of the session when the processor pauses the session; and wherein the processor is further operable to:

resume the session at the interrupted state of the session in response to receiving a resume signal;

communicate a query to a caller asking if the caller wants to replay or continue the message; and replay or continue the message in response to an answer to the query by the caller.

21. The system of claim 20, wherein the processor is further operable to initiate a workflow comprising a plurality of stages, each stage defining an output from the processor in response to an input to the processor.

22. The system of claim 21, wherein the workflow further comprises:

a pausible stage during which the processor is operable to pause the session; and a nonpausible stage during which the processor is not operable to pause the session.

23. A method for pausing a session with a voice response unit, the method comprising:

establishing a session with a voice response unit;

receiving a pause signal;

pausing the session in response to the pause signal, whereby a message is interrupted when the session is paused;

determining an interrupted state of the session when the session is paused;

receiving a resume signal;

resuming the session in response to the resume signal, wherein the session is resumed at the interrupted state of the session;

communicating a query to a caller asking if the caller wants to replay or continue the interrupted message; and replaying or continuing the interrupted message in response to an answer to the query by the caller.

24. The method of claim 23, further comprising initiating a workflow comprising a plurality of stages, each stage defining an output from the processor in response to an input to the processor.

25. The method of claim 24, wherein the workflow further comprises:

a pausible stage during which the processor is operable to pause the session; and a nonpausible stage during which the processor is not operable to pause the session.

26. Voice response software embodied in a computer-readable medium and operable to:

establish a session with a voice response unit;

receive a pause signal;

pause the session in response to the pause signal, whereby a message is interrupted when the session is paused;

determine an interrupted state of the session when the session is paused;

receive a resume signal;

resume the session in response to the resume signal, wherein the session is resumed at the interrupted state of the session;

communicate a query to a caller asking if the caller wants to replay or continue the interrupted message; and replay or continue the message in response to an answer to the query by the caller.

27. The voice response software of claim 26, further operable to initiate a workflow comprising a plurality of stages, each stage defining an output from the processor in response to an input to the processor.

28. The voice response software of claim 27, wherein the workflow further comprises:

a pausible stage during which the processor is operable to pause the session; and a nonpausible stage during which the processor is not operable to pause the session.

29. A system for pausing a session with a voice response unit, the system comprising:

- means for establishing a session with a voice response unit;
- means for receiving a pause signal;
- means for pausing the session in response to the pause signal, whereby a message is interrupted when the session is paused;
- means for determining an interrupted state of the session when the session is paused;
- means for receiving a resume signal;
- means for resuming the session in response to the resume signal, wherein the session is resumed at the interrupted state of the session;
- means for communicating a query to a caller asking if the caller wants to replay or continue the interrupted message; and
- means for replaying or means for continuing the interrupted message in response to an answer to the query by the caller.

30. The system of claim 29, further comprising means for initiating a workflow comprising a plurality of stages, each stage defining an output from the processor in response to an input to the processor.

31. The system of claim 30, wherein the workflow further comprises:

- a pausible stage during which the processor is operable to pause the session; and
- a nonpausible stage during which the processor is not operable to pause the session.

32. A method for pausing a session with a voice response unit, the method comprising:

- establishing a session with a voice response unit;
- initiating a workflow comprising a plurality of stages, each stage defining an output from the processor in response to an input to the processor, wherein the workflow further comprises:
  - a pausible menu message stage during which the processor is operable to pause the session; and
  - a nonpausible information retrieving stage during which the processor is not operable to pause the session;
- receiving a pause signal;
- pausing the session in response to the pause signal, whereby a message is interrupted when the session is paused;
- determining an interrupted state of the session when the session is paused;
- receiving a resume signal;
- resuming the session in response to the resume signal, wherein the session is resumed at the interrupted state of the session;
- communicating a query to a caller asking if the caller wants to replay or continue the interrupted message; and
- replaying or continuing the interrupted message in response to an answer to the query by the caller.

* * * * *